United States Patent [19]

Czech

[11] Patent Number: 4,485,943

[45] Date of Patent: Dec. 4, 1984

[54] DISPENSER FOR LIQUIDS OR PASTY PRODUCTS

[76] Inventor: Joachim Czech, Jahnstrasse 19,, D-8405 Donaustauf, Fed. Rep. of Germany

[21] Appl. No.: 355,682

[22] Filed: Mar. 8, 1982

[51] Int. Cl.³ .......................... B67D 5/52; G01F 11/00

[52] U.S. Cl. .................................... 222/256; 222/340; 222/380; 222/383

[58] Field of Search ............... 222/450, 340, 383, 256, 222/386, 386.5, 372, 380, 378, 382

[56] References Cited

U.S. PATENT DOCUMENTS

| | | | |
|---|---|---|---|
| Re. 30,566 | 4/1981 | Horvath | 222/340 |
| 2,435,527 | 2/1948 | Arpin | 222/340 |
| 3,124,275 | 3/1964 | Lake | 222/450 |
| 3,187,960 | 6/1965 | Gorman | 222/340 |
| 3,788,556 | 1/1974 | Riccio | 222/383 |
| 4,155,485 | 5/1979 | Spatz | 222/340 |
| 4,243,159 | 1/1981 | Spatz | 222/340 |
| 4,272,228 | 6/1981 | Kutik et al. | 222/383 |
| 4,323,175 | 4/1982 | Eckert | 222/256 |
| 4,396,132 | 8/1983 | Christensen | 222/380 |

*Primary Examiner*—Charles A. Marmor
*Assistant Examiner*—Kevin P. Shaver
*Attorney, Agent, or Firm*—James E. Nilles

[57] ABSTRACT

A dispenser for a liquid or pasty product comprises a container containing the respective product and having its upper end closed by a partition having at least one opening therethrough. The partition is covered by a head piece provided with an applicator and forms, together with the partition, a pump chamber, the volume of which is adapted to be varied by actuation of exterior means. The pump chamber is separated from the container by a first check valve adapted to open only towards the pump chamber and is separated from the outlet of the applicator by a second check valve adapted to open only towards said outlet. The first check valve takes the form of an insert fabricated by punching, or stamping or molding of flexible resilient material and comprises an inner member, an outer member spaced from but concentric with the inner member, and at least one (but preferably two) arcuately shaped resilient element concentrically located in the space between the members and integrally connected at its opposite ends to the inner and outer members. In one embodiment the inner member serves as a movable closure member sealingly covering the opening in the partition in its closed position and the outer member serves as a retainer member engageable with a portion of said partition to properly position the insert relative to the opening. In another embodiment the outer member serves as the closure member and cooperates with a plurality of openings and the inner member takes the form of a sleeve which receives a pin provided on the partition centrally of the openings.

10 Claims, 7 Drawing Figures

DISPENSER FOR LIQUIDS OR PASTY PRODUCTS

Figure 1:
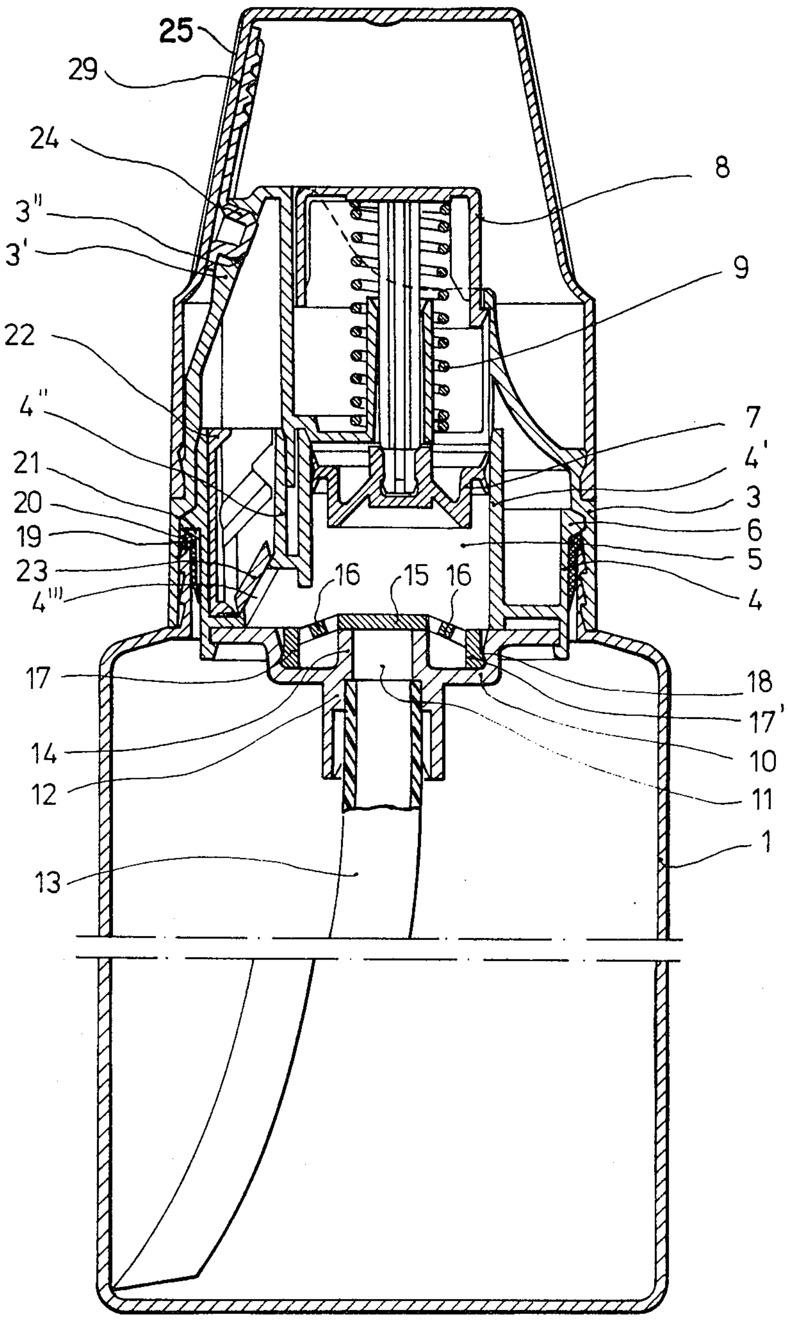

This invention relates to a dispenser for liquids or pasty products, comprising a container containing the respective product and having its upper end closed by a partition having at least one opening therethrough and covered by a head piece provided with an applicator and forming together with said partition a pump chamber the volume of which is adapted to be varied by exterior actuation, said pump chamber being separated from said container by a check valve adapted to open only towards said pump chamber, and from the outlet of said applicator, by a second check valve adapted to open only towards said outlet.

In known dispensers of the above defined type the first check valve adjacent the opening of the partition between the interior of the container and the pump chamber requires rather complicated production techniques. If such check valves are made and assembled as separate units, the design, production and assembly is very troublesome and involves considerable expense. If the closure members of such check valves, particularly in the form of closure flaps, are formed as components of inserts to be inserted in head pieces of dispensers, wherein such inserts perform additional functions such as that of a pump chamber and that of a communicating channel leading to the applicator, the production thereof, particularly by the plastics injection moulding method, requires the employ of complicated and expensive injection moulds.

It is therefore an object of the invention to provide a dispenser of the type specified in the introduction, wherein the first check valve is of simple design and lends itself to economical fabrication while ensuring reliable function of said first check valve.

In view of this object the invention provides that the first check valve comprises a closure member sealingly covering the opening, or openings, respectively, of the partition in its closed position, and in that said closure member is integrally connected by at least one resilient element to a retainer element to provide a unit in the form of an insert adapted to be received in a seat formed in said partition.

In the dispenser according to the invention, the closure member of the first check valve may be formed, together with a retainer element and at least one resilient element connecting said closure member to said retainer element, as an integral component by the employ, for instance, of a simple injection mould, in the form of an insert to be located on the partition adjacent the opening or openings thereof. In this manner there results a very economical fabrication. The mounting of the insert directly on the partition adjacent the opening or openings thereof ensures accurate positioning of the closure member, and thus, reliable operation of the check valve. Thus the dispenser according to the invention requires neither the expensive fabrication of separate check valve units nor the relatively complicated incorporation of the closure member of the first check valve in components performing additional functions. The construction according to the invention is applicable to dispensers for pasty products as well as for liquids.

In an advantageous embodiment of a dispenser for liquid products the invention provides that each opening of the partition connects downwards to a suction tube extending into the container and having an open lower end, that the lower end of the container is closed by a bottom connected to the walls of the container, and that adjacent the partition there is provided at least one passage connecting the interior of the container with the atmosphere, possibly in combination with a device preventing the escape of the container's contents. In such an embodiment of the dispenser according to the invention, reduction of the volume of the pump chamber causes the first check valve to close and the liquid contained in the pump chamber to be expelled through the second check valve and the applicator outlet. Subsequent increase of the volume of the pump chamber causes the second check valve to close and a vacuum to be created in the pump chamber, whereby the first check valve is opened and liquid from the interior of the container is sucked upwards into the pump chamber through the suction tube or tubes. As the space of the container's interior above the liquid level communicates with atmosphere through a passage, for instance through a narrow connecting channel, it is under atmospheric pressure.

In an alternative embodiment of a dispenser particularly suited for pasty products the invention provides that the lower end of the container forms an opening sealingly closed by a piston in sliding contact with the container's interior wall surface. In this embodiment, atmospheric pressure acts on the outside surface of the piston, and through the intermediary thereof, on the contents of the container. Reduction of the pump chamber's volume by actuation from the exterior causes the pasty product contained therein to be expelled through the second check valve and the applicator outlet, with the first check valve being closed. As the volume of the pump chamber is subsequently increased, the second check valve closes, causing a vacuum to be created in the pump chamber, whereby the first check valve is opened. Under the influence of the atmospheric pressure acting on the exterior surface of the slidingly guided piston, a further amount of the pasty product is displaced into the pump chamber through the first check valve.

In a particularly advantageous embodiment of a dispenser for use with liquid products as well as with pasty products, the invention provides that the head piece comprises a pump element adapted to be actuated from the exterior for displacement relative to the partition to vary the pump chamber's volume and biased by a return spring in the direction away from the partition, and that the applicator of the head piece includes an outlet channel laterally offset with respect to the opening or openings of the partition. In this embodiment, reduction of the pump chamber volume is accomplished by manually depressing the pump element. Expansion of the Pump chamber volume is subsequently achieved in an automatic manner by the return spring pushing the pump element outwards.

In a particularly advantageous configuration of this embodiment the invention provides that the head piece contains an insert having an upwardly and downwardly open hollow cylindrical portion forming a substantially cylindrical pump chamber as well as a portion connecting the pump chamber with the applicator, and that the exteriorly actuatable pump element is designed as a pump piston slidingly guided in the hollow cylindrical portion of the insert. This construction is particularly economical with a view to its fabrication, and particularly simple and reliable as regards its operation.

The dispenser according to the invention is advantageously designed in such a manner that the partition has an opening the edge of which is formed as an upwardly projecting tube section and that the closure member is formed as a disk covering the end face of the tube section and connected to an annular retainer element by at least one resilient arm, and that the partition is formed with a seat for receiving the annular retainer element. This design results not only in a simple and economically manufacturable closure member insert, but also in a construction of the first check valve particularly suited for the handling of liquids, wherein the suction tube is mounted below the upwardly projecting tube section of the partition.

For a simple and reliable mounting of the above described closure member insert on the partition, the dispenser according to the invention is advantageously designed in such a manner that the seat on the partition is formed with a projection extending around the outer periphery of the annular retainer element, or with a plurality of projections distributed around the outer periphery of the annular retainer element for gripping the outer periphery of the retainer element. In this manner, the closure member insert may be readily and reliably positioned and affixed to the partition by pressing and capturing the annular retainer element of the insert behind the annular projection, or the projections, respectively.

In an alternative embodiment of a dispenser particularly suited for the handling of pasty products the invention provides that the partition has a plurality of openings distributed around a center point, that the closure member is formed as an annular cover member covering the openings in the closed position and connected by means of at least one resilient arm to a sleeve-shaped retainer element located within the annular cover member, and that the partition is provided with an upwardly projecting pin adapted to receive the sleeve-shaped retainer element thereon. This design also makes use of a closure member insert of particularly simple construction, the closure member of which is formed as an annular cover member for covering all of the openings in the partition simultaneously in the closed position. The attachment of the closure member insert to the partition is accomplished by seating the sleeve-shaped retainer element on the pin in a simple and reliable plug connection.

In an advantageous modification of this embodiment, in which the pin on the partition and the sleeve seated thereon do not project into the pump chamber, the invention provides that the partition has a downwardly extending cup-shaped recess on the bottom of which the pin is located.

Further embodiments of the invention will become evident from the patent claims.

Figure 2:
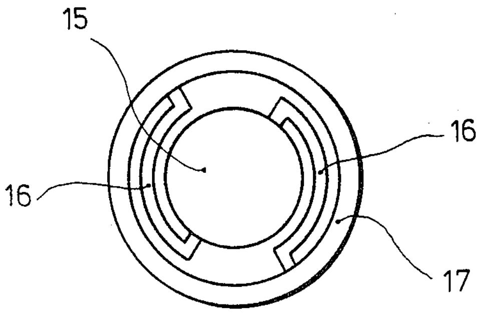
Figure 4:
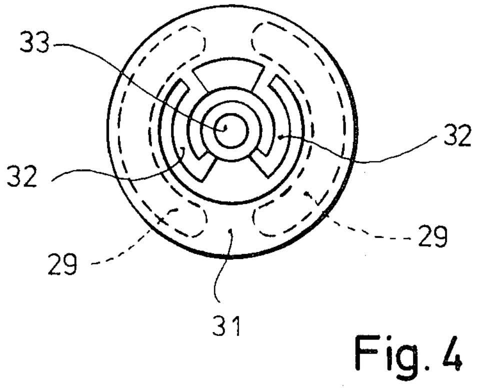
Figure 6:
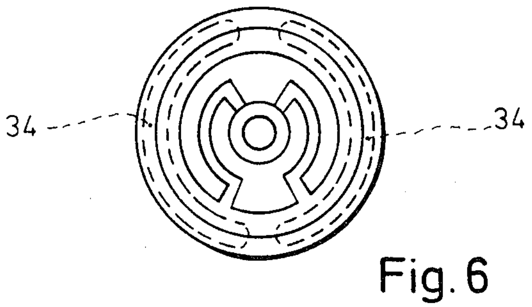
Figure 3:
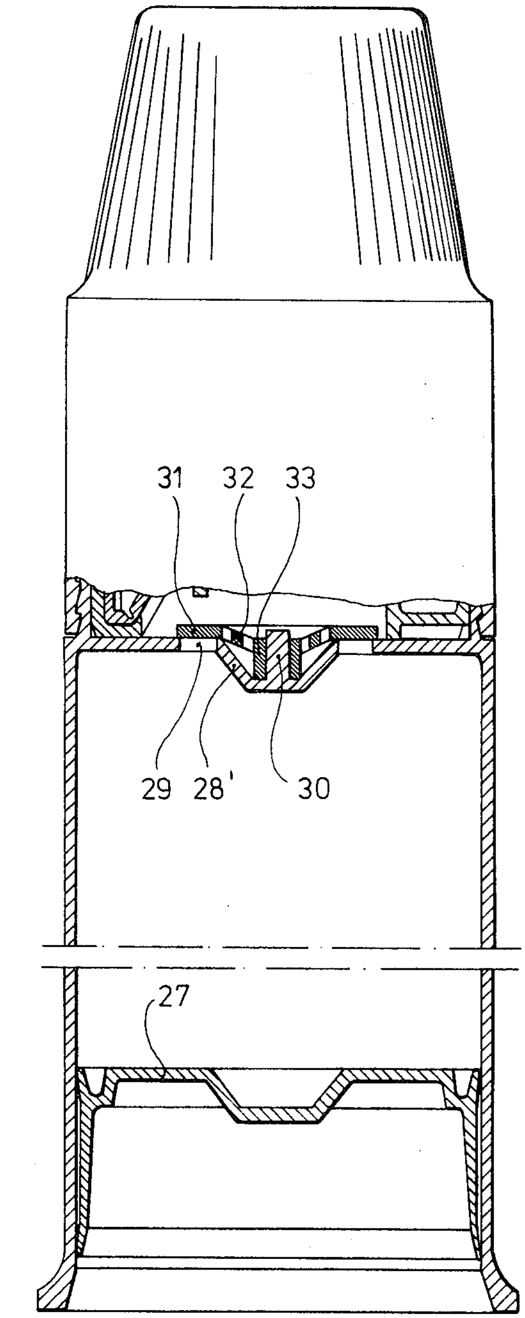
Figure 5:
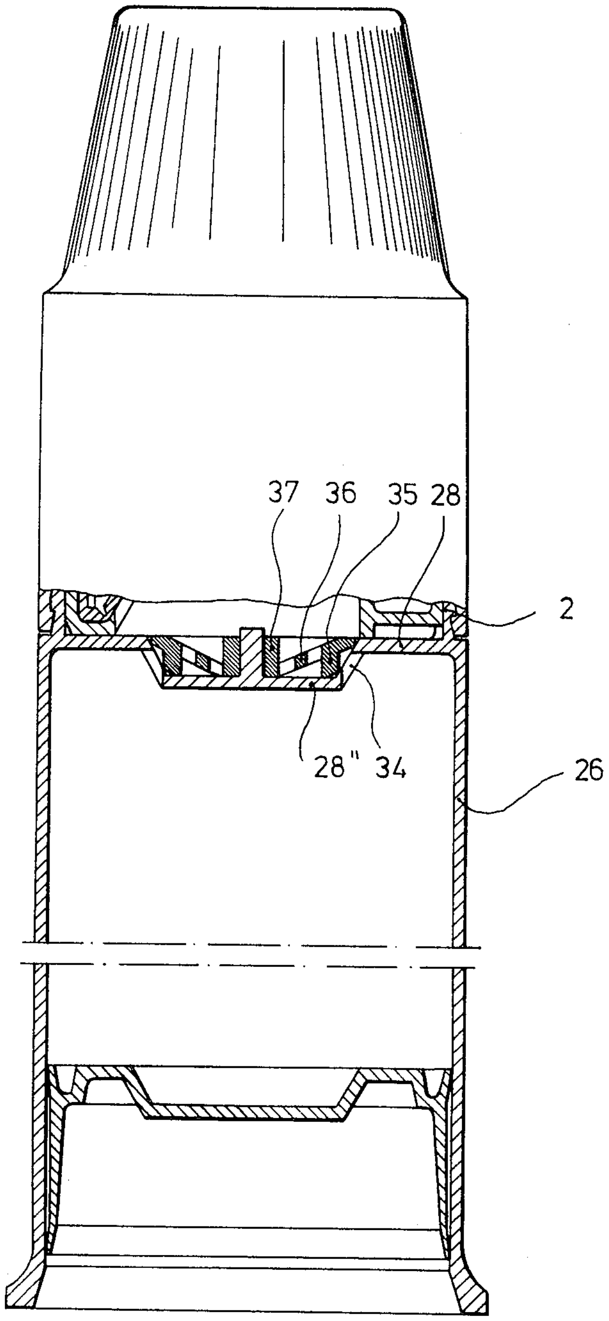
Figure 7:
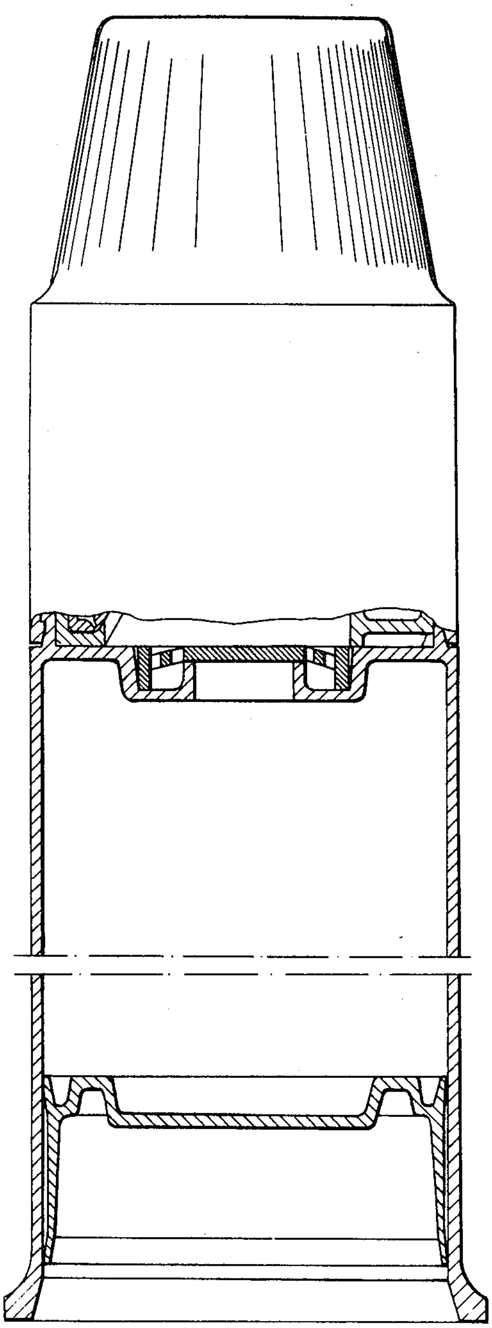

Embodiments of the invention shall now be described by way of example with reference to the accompanying drawings, wherein:

FIG. 1 shows a longitudinal sectional view of a first embodiment of a dispenser according to the invention particularly suited for the handling of liquids, FIG. 2 shows a top plan view of a closure member insert of the dispenser shown in FIG. 1, FIG. 3 shows a longitudinal sectional view of a second embodiment of a dispenser according to the invention particularly suited for the handling of pasty products, FIG. 4 shows a top plan view of a closure member insert of the dispenser according to FIG. 3, FIG. 5 shows a longitudinal sectional view of a third embodiment of a dispenser according to the invention suitable for handling pasty products, FIG. 6 shows a top plan view of a closure member insert of the dispenser shown in FIG. 5, and FIG. 7 shows a longitudinal sectional view of a fourth embodiment of a dispenser according to the invention for handling pasty products.

Shown in FIG. 1 is a first embodiment of a dispenser according to the invention for handling liquid products. The dispenser shown comprises a container 1, the lower end of which is closed by an integrally formed bottom, and the upper end of which is formed with a large circular opening, the edge of which is provided with an upwardly projecting tubular sleeve 2. On top of container 1 there is located a head piece 3 provided at its lower end with projections extending around its inner periphery. Head piece 3 is slipped onto sleeve 2 of container 1, so that the projections extending around the inner periphery of its lower end portion are received in groove-shaped recesses formed between annular projections extending around the outer periphery of sleeve 2, resulting in an intermeshed snap-fit connection. Head piece 3 is formed with an applicator 3' having an outlet 3'' provided therein. Located within head piece 3 is an insert 4 comprising an upwardly and downwardly open hollow cylindrical portion 4' forming a substantially cylindrical pump chamber 5, and a portion 4'' connecting pump chamber 5 to head piece 3. The outer periphery of insert 4 is formed with a radially projecting, circumferentially extending flange 6 adapted on insertion of insert 4 into head piece 3 to engage a complimentary recess formed at the inner periphery of head piece 3 and extending in circumferential direction. In this manner there is provided a simple and positive connection between head piece 3 and insert 4.

The insertion of insert 4 into head piece 3 is carried out prior to the latter being mounted on sleeve 2 of container 1.

A pump element in the form of a pump piston 7 is guided in hollow cylindrical portion 4' of insert 4 in a sliding fit. Piston 7 is connected to an actuator button 8 guided for axial displacement in a recess of head piece 3. Button 8, and thus piston 7, are biased in an upward direction by a return spring 9 in the form of a compression spring located between button 8 and head piece 3.

The upper section of portion 4'' of insert 4 is formed as a tubular member received in the outlet channel of applicator 3'. The lower section of portion 4' is formed with a connecting channel having a connecting opening 4''' communicating the interior of pump chamber 5 with the interior of portion 4''.

Provided at the upper end of container 1 is a partition 10 having an opening 11 therethrough. Partition 10 is formed as a separate insert having a circular outer edge affixed to the lower end of insert 4 by a snap-fit connection. An interior projection extending around the inner periphery of the lower end of insert 4 grips the peripheral edge of partition insert 10 from below to retain the latter rigidly connected to insert 4. The lower edges of hollow cylindrical portion 4' and of portion 4'' of insert 4 are in sealing engagement with the upper surface of partition 10. At the lower side of partition 10, opening 11 thereof is surrounded by a depending tubular projection 12, whereinto the upper end of a suction tube 13 extending downwardly into container 1 is inserted.

The peripheral edge of opening 11 in partition 10 is formed with an upwardly projecting tubular sleeve 14, the upper end face of which is formed as a seat for a closure member 15. Closure member 15 is formed as a circular disk integrally connected to an annular retainer member 17 by means of two resilient arms 16. Closure member 15 together with arms 16 and retainer member 17 forms a separate integral insert unit. Resilient arms 16 are formed as arcuate members extending concentrically with closure member 15 and having their ends integrally connected to the closure member and the retaining member, respectively. This thus-formed insert is shown in a top plan view in FIG. 2. Provided on partition 10 in concentrically surrounding relationship to tubular sleeve 14 is an annular wall portion having an inwardly projecting bead 18 extending along its inner periphery. Retaining ring 17 of closure member insert 15, 16, 17 is formed with an outer projection 17' extending around its outer periphery. Retaining ring 17 is affixed to partition 10 by exerting pressure thereon, so that projection 17' comes into engagement with the underside of bead 18. In this manner, retainer ring 17 is positively retained on partition 10. The upper opening of container 1 is closed by partition 10 and the outer wall surfaces of insert 4. The space between the outer wall surface of insert 4 and the upper end of container sleeve 2 is sealed by an annular seal 19 of an elastic material such as rubber or a synthetic resin, inserted therebetween. A flange at the upper end of annular seal 19 is clamped between flange 6 of insert 4 and the upper end face of container sleeve 2. The lower portion of annular seal 19 is formed as a skirt of wedge-shaped cross-section. In this manner the escape of liquid from container 1 between the outer wall surface of insert 2 and container sleeve 2 is reliably prevented. The lower portion of head piece 3 has its interior wall surface formed with an axially extending groove 20 between the lower edge of head piece 3 and the groove receiving flange 6 of insert 4. In extension of groove 20, flange 6 of insert 4 is provided with a groove-shaped recess 21. In this manner there is provided a capillary connection between the surrounding atmosphere and the interior of container 1. This connection, which may be supplemented by a complementary groove or recess in the interior wall surface of annular seal 19, ensures the possibility of a pressure equalization between the interior of container 1 and atmosphere. The escape, however, of liquid through this connection path is prevented, as the lower skirt portion of the annular seal prevents the entry of the liquid into the connection path.

Located within the tubular section of portion 4'' of insert 4 is an insert 22, the lower end of which is integrally connected to a closure flap 23 through a resilient web portion. Closure flap 23 is resiliently biased into engagement with the connecting opening 4''' of insert 4, cooperating therewith to form a second check valve controlling communication between pump chamber 5 and applicator 3'.

Outlet 3'' of applicator 3' is adapted to receive a closure plug 24 releasably inserted thereinto. A removable protection cap 25 is releasably mounted on head piece 3 from above. In the exemplary embodiment shown in FIG. 1, all of the components, with the exception of the metallic return spring, are formed of synthetic resin.

Operation of the dispenser for liquid products shown in FIG. 1 shall now be described in detail. If it is desired to dispense a liquid contained in container 1, one has at first to manually remove protection cap 25 from head piece 3, whereupon closure plug 24 is manually withdrawn from outlet 3''' of applicator 3'. The dispenser is then gripped with one hand, for instance by its head piece 3. By exerting finger pressure on actuating button 8, the latter is displaced inwardly against the bias exerted by return spring 9. This causes piston 7 to be moved towards partition 10, so that the volume of pump chamber 5 is reduced, biasing closure member 15 into engagement with the end face of tubular sleeve 14 to close the first check valve. Liquid contained in pump chamber 5 exerts a pressure on closure flap 23, whereby it is bent away from its closed position. This enables the liquid to escape through the channel in portion 4'' of insert 4 into applicator 3' and from there through outlet 3''. As soon as the liquid contained in pump chamber 5 has escaped in the manner described, button 8 is released, enabling it to return outwards to its rest position under the action of return spring 9. This causes pump piston 7 to be displaced away from partition 10, resulting in the volume of pump chamber 5 to be again increased. This creates a vacuum in the pump chamber, causing closure flap 23 to close the opening 4''' in portion 4'' of insert 4. On the other hand, the vacuum in pump chamber 5 causes closure member 15 of the first check valve to be lifted off tubular sleeve 14 against the action of resilient arms 16, so that opening 11 of partition 10 is no longer obstructed, and liquid is sucked into pump chamber 5 through suction tube 13. In this context it is of importance that atmospheric pressure is enabled to act within container 1 above the liquid level via the connection path 20, 21. At the end of the suction stroke piston 7 has returned to its upper end position. At this instance, closure member 15 is again brought into engagement with tubular sleeve 14 to close opening 11. The liquid now contained in pump chamber 5 may then be dispensed in the manner described by extering pressure on button 8.

The design of the first check valve of the dispenser shown in FIG. 1 permits the closure member 15 as well as the valve seat on the partition to be manufactured in a simple and economical manner by injection moulding of a synthetic resin material employing relatively inexpensive injection moulds of simple design. The attachment of the insert unit integrally formed of the closure member 15, the resilient arms 16 and the retaining ring 17 to the partition 10 is quickly and readily accomplished as a snap fit and ensures accurate alignment between the closure member 15 and its seat, i.e. sleeve 14, as well as a reliable function of the first check valve and a reliable closing operation of the closure member as required.

FIG. 3 shows a second exemplary embodiment of a dispenser according to the invention for handling pasty products. As far as the construction of the dispenser of FIG. 3 corresponds to that of the dispenser shown in FIG. 2, similar parts are designated by the same reference numerals. These parts and their function need not again be described. In the first place, the dispenser shown in FIG. 3 differs from that depicted in FIG. 1 by the lower end of the container 26 holding the pasty product not being closed by a bottom wall fixedly connected thereto, being open instead. The lower opening of container 26 is closed by a piston 27 sealingly guided in sliding engagement with the container interior wall surface. Further the partition 28 of the dispenser shown in FIG. 3 is integrally connected to the upper end of container 26. Head piece 3 together with insert 4 is plugged onto container sleeve 2 in a similar manner as shown in FIG. 1. In this case, however, the provision of an annular seal between insert 4 and sleeve 2 is not required, as partition 28 is integrally connected to container 26 and the lower end of insert 4 is in sealing engagement with the upper surface of partition 28, while the plug connection between head piece 3 and container sleeve 2 is sufficiently tight to prevent the escape of the pasty product.

Partition 28 is formed with two arcuate openings 29 located concentrically with the center axis of container 26 diametrically opposite one another. Partition 28 further comprises a downwardly extending cup-shaped recess 28', the bottom of which is integrally formed with an upwardly projecting pin 30. Openings 29 of partition 28 extend along the flat portion of the partition outside the upper edge of recess 28'. Openings 29 are covered by a closure member 31 formed as a flat ring. Closure member 31 is integrally connected to a sleeve-shaped retainer element 33 by means of two resilient arms 32. In this manner closure member 31 together with resilient arms 32 and retainer element 33 forms an integral insert unit adapted to be manufactured in a simple and economical manner by an injection moulding method using a simple mold. For connection to partition 28, sleeve-shaped retainer element 33 is slipped onto pin 30. The first check valve of the dispenser of FIG. 3 is thus formed by the closure member insert unit 31, 32, 33 together with openings 29 and cup-shaped recess 28' containing pin 30. In the closed position of the first check valve, annular closure mqmber 31 sealingly overlies openings 29. Shown in FIG. 4 is a top plan view of the first check valve of the dispenser according to FIG. 3.

The dispenser shown in FIG. 3 functions in the following manner: Depression of button 8 causes piston 7 to be displaced towards partition 28 so as to reduce the volume of pump chamber 5. This causes pasty material contained in pump chamber 5 to be expelled through the second check valve, flap 23 of which is lifted off opening 4''', into applicator 3'' and from there through outlet 3'''. At this instance the first check valve is closed, as closure member 31 is biased into engagement with partition 28 so as to cover openings 29. On release of button 8, piston 7 is moved upwardly by the action of spring 9, so that the volume of pump chamber 5 is enlarged. This creates a suction effect causing the second check valve to close by flap 23 covering opening 4'''. The atmospheric prssure acts from below on piston 27 and thereby on the contents of container 26, so that closure member 31 is lifted off openings 29 against the action of resilient arms 32 due to the differential pressure between the vacuum in pump chamber 5 and the pressure within container 26. This permits the pasty product to enter pump chamber 5 through openings 29, while piston 27 is displaced upwardly relative to the peripheral wall of container 26 by the action of the atmospheric pressure thereon. At the end of the upward stroke of pump piston 7, pump chamber 5 is again filled with the pasty product, whereupon closure member 31 returns to sealing engagement with openings 29 of partition 28. Subsequently the pasty product may again be expelled from pump chamber 5 through applicator 3' in the manner described.

Also in this embodiment of the dispenser according to the invention, the design of the first check valve permits a simple and economical manufacture and assembly and ensures reliable function of the valve. In the closed position of the first check valve, the relatively large openings 29 in partition 28 required for passage of a pasty product are reliably closed by closure member 31.

A further embodiment of a dispenser according to the invention for handling pasty products is depicted in FIGS. 5 and 6. This embodiment differs from the one shown in FIGS. 3 and 4 solely by the design of the first check valve. With regard to the construction and function of the remaining parts of the dispenser, reference may therefore be had to the preceding description. In the dispenser shown in FIG. 5, partition 28 is again formed with a downwardly extending cup-shaped recess 28'' with an upwardly projecting pin 30 formed integrally with its bottom. The lateral wall of recess 28'' is provided with elongate openings 34. A closure member 35 for covering openings 34 in the closed position of the valve is formed as an annular cover member comprising circumferentially extending upper and lower edges adapted in the closed position to engage the interior wall surface of recess 28'' above and below openings 34, respectively. Annular closure member 35 is integrally connected to a sleeve-shaped retainer element 37 by means of two resilient arms 36, resulting in an integral insert unit adapted to be simply and economically manufactured. For attachment to partition 28, retainer element 37 is slipped onto pin 30. FIG. 6 shows a top plan view of the first check valve formed in the obove described manner.

Operation of the dispenser according to FIG. 5 is similar to that of the dispenser shown in FIG. 3, so that reference may be had to the respective description.

A further embodiment of a dispenser according to the invention for handling pasty products is shown in FIG. 7. With the exception of the design of the first check valve, the construction of the dispenser according to FIG. 7 corresponds to that of the dispensers shown in FIGS. 3 and 5, respectively. On the other hand, the design of the first check valve of the dispenser of FIG. 7 corresponds to that of the first check valve in the dispenser shown in FIG. 1. The top plan view of the first check valve of the dispenser according to claim 1 as shown in FIG. 2 may thus be considered also as a top plan view of the first check valve in the dispenser of FIG. 7. For the understanding of the design of this first check valve reference may therefore be had to the respective description of the dispenser according to FIGS. 1 and 2.

The invention is not restricted to the exemplary embodiments described above. It is thus possible to modify the design of the head piece of the dispenser as well as that of the first check valve.

Any characteristics contained in the above description may be essential to the invention by themselves or in any combination.

I claim:

1. A dispenser for a liquid or pasty product comprising: a container (26) for containing said product, a piston (27) in sliding contact with the interior wall surface of said container for sealingly closing an opening at the lower end of said container, a partition (28) for closing the upper end of said container, said partition being formed with a downwardly extending cup-shaped recess (28'') having a lateral wall and a bottom wall, a plurality of openings (34) formed in said lateral wall, an upwardly projecting pin (30) provided on said bottom wall of said recess, a head piece (3) provided with an applicator (3') having an outlet (3'') and forming together with said partition a pump chamber (5), the volume of said pump chamber being adapted to be varied by exterior actuation, check valve means (23) located bebetween said pump chamber and said outlet and adapted to open only towards said outlet, and a first check valve located between said pump chamber and said container and adapted to open only towards said pump chamber, said first check valve comprising: a sleeve-shaped retainer element (37) disposed on said upwardly projecting pin, at least one resilient arm (36) connected at one end to said retainer element, and an annular cover member 35 arranged concentrically around said retainer element and connected to the other end of said resilient arm, said annular cover member having circumferentially extending upper and lower edges to engage said lateral wall of said recess above and below said openings, respectively to cover said openings when said annular cover member is in closed position.

2. A dispenser for a liquid or pasty product, comprising a container containing the respective product and having its upper end closed by a partition having a plurality of openings therethrough and covered by a head piece provided with an applicator having an outlet and forming together with said partition a pump chamber, said partition being formed with a downwardly extending cup-shaped recess on the bottom of which an upwardly projecting pin is located, said openings being located in a lateral wall of said recess, the volume of said pump chamber being adapted to be varied by actuation of exterior means, said pump chamber being separated from said container by a first check valve adapted to open only towards said pump chamber, and said pump chamber being separated from the outlet of said applicator by a second check valve adapted to open only towards said outlet, characterized in that said first check valve is an insert fabricated of flexible material and comprises an inner member, an outer member spaced from but concentric with said inner member and at least one arcuately shaped resilient element concentrically located in the space between the inner and outer members and integrally connected at its opposite ends to said inner member and said outer member, said outer member being a movable annular closure member sealingly covering said opening of said partition in its closed position and said inner member being a sleeve-shaped retainer member engageable with said pin on said partition to position said insert, said annular closure member having circumferentially extending upper and lower edges adapted in the closed position to come into engagement above and below said openings, respectively, from within said recess.

3. A dispenser according to claim 2 characterized in that said insert includes a plurality of resilient elements.

4. A dispenser for a liquid or pasty product comprising: a container for containing said product, the lower end of said container (26) being formed with an opening sealingly closed by a piston (27) in sliding contact with the container's interior wall surface, and having its upper end closed by a partition which is provided with an upward projecting pin (30) and having a plurality of openings (29; 34) therethrough distributed around a center point and covered by a head piece provided with an applicator and forming together with said partition a pump chamber, the volume of which is adapted to be varied by exterior actuation, said pump chamber being separated from said container by a first check valve adapted to open only towards said pump chamber, and from the outlet of said applicator, by a second check valve adapted to open only towards said outlet, characterized in that said first check valve comprises a closure member formed as an annular cover member (31; 35) sealingly covering said openings of said partition (10) in its closed position and in that said closure member is connected by at least one resilient arm to a sleeve-shaped retainer element (33; 37) located within said annular cover member and mounted on said pin (30) to provide a unit in the form of an insert adapted to be received in a seat formed in said partition.

5. A dispenser according to claim 4, characterized in that said partition is formed with a downwardly extending cup-shaped recess (28'; 28") on the bottom of which said pin (30) is located.

6. A dispenser according to claim 5, characterized in that said openings (29) are located in a flat portion of said partition (28) outward of the upper edge of said recess (28'), and in that said annular cover member (31) is formed as a flat ring.

7. A dispenser for a liquid or pasty product, comprising a container containing the respective product and having its upper end closed by a partition having an upwardly projecting pin and having a plurality of openings therethrough distributed around a center point and covered by a head piece provided with an applicator and forming together with said partition, a pump chamber, the volume of which is adapted to be varied by actuation of exterior means, said pump chamber being separated from said container by a first check valve adapted to open only towards said pump chamber, and from the outlet of said applicator, by a second check valve adapted to open only towards said outlet, characterized in that said first check valve is an insert fabricated of flexible material and comprises an inner member, an outer member spaced from but concentric with said inner member, and at least one arcuately shaped resilient element concentrically located in the space between the inner and outer members and integrally connected at its opposite ends to said inner member and said outer member, said outer member being a movable closure member formed as an annular cover member sealingly covering said openings of said partition in its closed position and said inner member is a sleeve-shaped retainer member engageable with said pin on said partition to position said insert.

8. A dispenser according to claim 7 characterized in that said insert includes a plurality of resilient elements.

9. A dispenser according to claim 7, characterized in that said partition is formed with a downwardly extending cup-shaped recess on the bottom of which said pin is located.

10. A dispenser according to claim 9 characterized in that said openings are located in a flat portion of said partition outward of the upper edge of said recess, and in that said annular cover member is formed as a flat ring.

* * * * *